(12) United States Patent
Andrade

(10) Patent No.: US 10,749,865 B2
(45) Date of Patent: *Aug. 18, 2020

(54) SYSTEMS AND METHODS FOR PROVIDING BLOCK CHAIN OR DISTRIBUTED LEDGER-BASED ENTITY IDENTITY AND RELATIONSHIP VERIFICATION

(71) Applicant: BLACK GOLD COIN, INC., Las Vegas, NV (US)

(72) Inventor: Marcus Andrade, Fernley, NV (US)

(73) Assignee: Black Gold Coin, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,004

(22) Filed: May 11, 2018

(65) Prior Publication Data

US 2018/0262493 A1 Sep. 13, 2018

Related U.S. Application Data

(63) Continuation-in-part of application No. 15/083,241, filed on Mar. 28, 2016, now Pat. No. 9,985,964.

(51) Int. Cl.
  *G06F 21/00* (2013.01)
  *H04L 29/06* (2006.01)
  *G06F 21/31* (2013.01)
  *G06F 21/30* (2013.01)

(52) U.S. Cl.
  CPC .......... *H04L 63/0861* (2013.01); *G06F 21/30* (2013.01); *G06F 21/31* (2013.01); *H04L 63/08* (2013.01); *H04L 29/06* (2013.01); *H04L 63/00* (2013.01); *H04L 2463/082* (2013.01)

(58) Field of Classification Search
  CPC .......... G06F 21/30; G06F 21/31; G06F 21/32; G06F 21/33; G06F 21/40; G06F 21/60; G06F 21/602; G06F 21/604; G06F 21/64; G06F 21/645; H04L 9/006; H04L 9/0861; H04L 9/0866
  See application file for complete search history.

(56) References Cited

U.S. PATENT DOCUMENTS

| | | | | |
|---|---|---|---|---|
| 2015/0324789 | A1* | 11/2015 | Dvorak | G06Q 20/3823 705/67 |
| 2015/0356523 | A1* | 12/2015 | Madden | G06Q 20/065 705/76 |
| 2016/0098730 | A1* | 4/2016 | Feeney | G06Q 30/0185 705/71 |

* cited by examiner

*Primary Examiner* — Edward Zee
(74) *Attorney, Agent, or Firm* — Bell Nunnally & Martin LLP

(57) ABSTRACT

Block chain/distributed ledger-based verification of entity identity or verification of a relationship between two or more entities may be provided. Verification addresses may be established on a block chain/distributed ledger by: associating identifiers and verifiers with entities having previously verified entity identities or having previously verified relationship(s) with other entities, assigning verification addresses on a block chain/distributed ledger to the entities, and recording entity identifier(s), identity verifier data and relationship verifier data associated with the entities at corresponding verification addresses. Embodiments for block chain/distributed ledger-based verification of entity identity and/or verification of entity's relationship to related entity(ies) using the verification addresses are performed using one or more identity verifiers and/or one or more relationship verifiers.

25 Claims, 5 Drawing Sheets

SYSTEMS AND METHODS FOR PROVIDING BLOCK CHAIN OR DISTRIBUTED LEDGER-BASED ENTITY IDENTITY AND RELATIONSHIP VERIFICATION

FIELD OF THE DISCLOSURE

This disclosure relates to systems and methods for providing distributed ledger-based entity identity and relationship verification.

SUMMARY

In accordance with one or more aspects of the invention, systems and methods for providing block chain/distributed ledger-based verification of entity identity and verification of relationship among entities, which may be single and which may be preferably multifactor, include storing entity verifiers and/or relationship verifiers on a block chain/distributed ledger, and/or using that information: (1) to verify the identity of an entity, herein such entity is an individual, a company, an organization, institution, a government (or government agency), a living thing or asset (e.g., a horse, a dog, a plant, a car, medical records, etc.), a tangible or intangible thing or asset, or a thing in the internet of things, and/or (2) to verify the relationship between two or more entities, where the relationship is any type of relationship, such as ownership, lessee interest, engagement, social relationship, ancestry relationship, genetic relationship, superentity-subentity relationship, etc.

Entity identifier as used herein may be a digital identity assigned by a system, and used as an entity identifier for the express purpose of distinguishing identity of an entity recorded in the system. An entity may be an individual, a company, a government, an institution, institutions, a tangible thing or an intangible thing. In some implementations, such an entity identifier may be referred to as an "Aten ID."

Identity verifiers as used herein may include anything that uniquely or substantially uniquely identifies individuals, companies, organizations, government, tangible or intangible things or assets, or devices (e.g., in the internet of things). Identity verifiers may include the following data, often used for the express purpose of distinguishing identity (preferably uniquely, and so sometimes used in combination with other data):

Full name, face, IP address, home address, email address, national identification number, such as social security number, passport number, vehicle registration plate number or serial number, driver's license number, face, fingerprints, or handwriting, credit card numbers, electronic device identifiers, digital identity (information on a person, device, organization, institution or company used by computer systems to represent an external agent, such as a person, organization, application, or device, or other set of attributes related to any entity), date of birth, birthplace, genetic information, residential address, company address, work address, email address, telephone number, time of log in, login name, screen name, nickname, or handle, e.g., a social media account name or identifier, such as account name, e.g., "Internet Guru 33" plus the company, e.g., Facebook®, government issued documents themselves, e.g., birth certificate, social security card, draft card, military ID, drivers' license, marriage certificate, etc., share certificate(s), stock certificate(s), property certificate(s), subscription certificate(s), academic certificate(s), health/medical records and/or health documents and any other identity verifiers.

Other identity verifiers may include, e.g., IP address, production serial number, certificate number, bank account number, biometric data, etc.

Generally speaking biometric data may include metrics related to human characteristics. Biometric verifiers are distinctive, measurable characteristics that can be used to label and describe individuals. Biometric verifiers typically include physiological characteristics but may also include behavioral characteristics and/or other characteristics. Physiological characteristics may be related to the shape of an individual's body. Examples of physiological characteristics used as biometric data may include one or more of fingerprint, palm veins, face recognition, genomic information, DNA sequence(s) and DNA modification(s), proteomic information, and protein sequence(s) and protein modification(s), palm print, hand geometry, iris recognition, retina, odor or scent, heart rhythm and/or other physiological characteristics. Behavioral characteristics may be related to a pattern of behavior of an individual. Examples of behavioral characteristics used as biometric data may include one or more of typing rhythm, gait, voice, and/or other behavioral characteristics.

The biometric data may include one or more of an image or other visual representation of a physiological characteristic, a recording of a behavioral characteristic, a template of a physiological characteristic and/or behavioral characteristic, and/or other biometric data. A template may include a synthesis of relevant features extracted from the source. A template may include one or more of a vector describing features of a physiological characteristic and/or behavioral characteristic, a numerical representation of a physiological characteristic and/or behavioral characteristic, an image with particular properties and/or other information. The biometric data may be used in a variety of forms. For example, the biometric data and/or the template may be hashed before using as an identity verifier.

Combinations of the above information, and/or combinations of the following may also uniquely identify an entity such as a person: First or last name and/or initials, country, state, postcode or city of residence, age, gender or race, name of school attended/attending or workplace, grades, salary, or job position, criminal record, and/or web cookie(s). Other identity verifiers may include online purchasing patterns or purchases, online behaviors, digital footprints or digital shadows, i.e., one's unique set of traceable digital activities, actions, contributions and communications that are manifested on the Internet or on digital devices, geolocation data, personality information, driving patterns, financial account information, employment history, personal history, medical history, and/or other behavior information.

Additional identity verifiers for a company/business and/or government or agency may include: name of the government or government agency, name of the business plus state of formation, incorporation number, online purchasing behavior, IP address such as server address, web address (e.g., domain name/URL), state and/or federal license numbers and license type, financial account information, and/or identity verifiers of principal(s).

The Internet of Things (IoT) is the network of physical devices, vehicles, home appliances and other items embedded with electronics, software, sensors, actuators, and connectivity which enables these objects to connect and exchange data. Each thing is uniquely identifiable through its embedded computing system but is able to inter-operate within the existing Internet infrastructure. "Things", in the IoT sense, can refer to a wide variety of devices such as medical implant devices, transponders on animals, control and monitoring systems for automobiles, aircraft, boats, trains and other vehicles and transportation mechanisms, refrigerators, alarms, video cameras, microphones, robots, machines, home or business automation devices, or field operation devices that assist in first responder and/or emergency operations. Identity verifiers for things may include one or more of the following examples alone or in combination to achieve a unique or substantially unique identity verifier: serial numbers, brand and/or model data, device ID, device name, IP address, and/or a URL used for controlling and/or monitoring such device or its data.

An identity verifier may be an assigned identity verifier, e.g., a username and/or password, password generated by a one-time password algorithm, a PIN, a card and/or a device, an SMS text, a cryptographic entity public private key which is paired with an entity private key, a cryptographic verification private key which is paired with a verification public key, and any other multifactor identification method.

In some embodiments, identity verifier may be a digital index assigned by a system for identifying an electronic storage location of an item of identity verification data, and used as an identity verifier for the express purpose of verifying identity of an entity recorded in the system. A set of identity verification data may be biometric data and/or other unique information as noted above, e.g., including or relating to one or more of a passport, an identification card, extracted passport information, a driver's license, extracted driver's license information, and/or other information such as other government issued documentation and/or information extracted from such government issued documentation.

Relationship verifier as used herein may be a digital index assigned by a system for identifying storage location of a set of relationship verification data associated with an entity, and used as relationship verifiers for the express purpose of verifying relationship between two or more entities recorded in the system. In some embodiments, a relationship verifier(s) may be used as identity verifier(s) for verifying identity of an entity. When using relationship data to verify an entity's identity, the system may use the stored relationship data to generate one or more relationship questions. An entity's identity is verified upon the receipt of correct answers from the entity for the relationship questions. A set of relationship verification data may include data of related entity(ies), relationship linker(s) and additional information. Additional information may be any previously verified document(s) or previously verified information that supports existence of a relationship (e.g., share certificate, marriage certificate, verification certificate issued by an independent third party, etc.). Any relationship may only exist when there are two or more entities. When there is a relationship existing between two (or more) entities, an entity's relationship verification data must be logically matched with the relationship verification data of the other entity or entities.

When a relationship is an ownership, a set of relationship verification data may indicate a degree of ownership of a tangible thing which may be a property or an asset (e.g., a vehicle, a boat, a shipment container, art work, an apartment, a movement of a watch, an engine or motor in a vehicle, company shares), a degree of ownership of an intangible thing which may be a property, an asset or right (e.g. a patent, a copyright, goodwill, a trademark, a right to receive royalties from a patent license agreement, a usage right, an access right, a computer network, a digitized item such as a music file, a video, an electronic book, an amount of cryptocurrency), or a degree of ownership of a company by an individual, a company, an organization or a government. In some embodiments, a set of relationship data may indicate a degree of engagement (e.g., business engagement between two companies, marriage between two people), superentity-subentity relationship (e.g., device in a system, a component in a device), ancestry relationship (i.e., people's relationship in a family pedigree, such as father and son relationship), genetic relationship (e.g., how people are genetically linked), social relationship (e.g. two people are friends or connected at Facebook®, two people are working in the same company), etc. A set of relationship verification data may include the related entity data and a relationship linker, often used for the express purpose of distinguishing identity (preferably uniquely and so sometimes used in combination with other data).

Related entity data may be assigned to indicate a previously verified relationship between two (or more) entities. Related entity data as used herein may contain a paired entity identifier and relationship position of a related entity for documentation of a previously verified relationship. The relationship position indicates the relative position of a related entity in a relationship. When two entities have a relationship of possession or engagement, with respect to one particular entity, there are four possible types of relationship position, being (1) parent, (2) child, (3) coupled, or (4) sibling. When there are two entities, one owns the other one. The system may assign the former one as a parent entity of the latter one, while the system may assign the latter one as a child entity of the former one. For example, a car is a child entity of its car owner, whereas the car owner is a parent entity of his/her car. A shipment container is a child entity of its shipment company, whereas the shipment company is a parent entity of its shipment container. For each entity, it may be associated with more parent entities if it is jointly owned by more than one entity. For each entity, it may be also associated with more than child entities if it owns more than one entity. Moreover, the system may assign the child entities as a sibling entity of each other. For example, a car owner has more than one car. Each car is one of a child entity of its car owner, whereas the car owner is a parent entity of each of his/her cars. The cars are sibling entities of each other. A shipment company has more than one container. Each shipment container is one of the child entities of its shipment company, whereas the shipment company is the parent entity of each of her shipment containers. The shipment containers are sibling entities of each other. For each entity, it may be associated with one or more parent entities and/or one or more child entities. While the system may assign the child entities as sibling entities of each other, the system may also assign the parent entities are coupled entities of each other. For example, two people jointly own a shipment company, and the shipment company owns more than one shipment container. The two people are the parent entities of the shipment company, whereas the shipment containers are the child entities of the shipment company. The two people are coupled entities of each other, whereas shipment containers are sibling entities of each other. When verifying the relationship between two entities, a child entity must be one of the many child entities of a parent entity and the parent entity must be one of the many parent entities of the child entity; two coupled entities must be one of the coupled entities of each other; and two sibling entities must be one of the sibling entities of each other. For example, when verifying an ownership between a shipment company and a shipment container, the shipment container must be one of the child entities of the shipment company, and the shipment company must be one of the parent entities of the shipment container. When verifying an engagement between two shipment companies A and B, shipment company A must be one of the coupled entities of shipment company B, and shipment company B must be one of the coupled entities of shipment company A. When verifying a sibling relationship between two shipment containers X and Y, shipment container X must be one of the sibling entities of shipment container Y, and shipment container Y must be one of the sibling entities of shipment container X.

A relationship linker or linkers may be assigned to indicate a previously verified relationship between two (or more) entities. A relationship linker as used herein may contain a paired relationship label and relationship index for documentation of a previously verified relationship. The relationship label indicates the type of relationship (e.g., ownership, engagement, social relationship, ancestry relationship, genetic relationship, superentity-subentity relationship, relationship of things in IoT, etc.) and the relationship index is any value in a range of 0 to 100 which indicates the degree of relationship between two entities. For example, a relationship linker comprising an ownership label and a relationship index of 100 indicates a 100% ownership. A relationship linker comprising an ownership label and a relationship index of 51 indicates a 51% ownership. A relationship linker comprising an ownership and a relationship index of 0 indicates an absence of ownership. A relationship linker comprising an engagement label and a relationship index may be used to indicate the degree of engagement. A relationship linker comprising an engagement label and a relationship index of 100 indicates a 100% engagement. A relationship linker comprising an engagement label and a relationship index of 51 indicates a 51% engagement. A relationship linker comprising an engagement label and a relationship index of 0 indicates an absence of engagement. A relationship linker comprising an ancestry label and 100% indicates that two people are directly linked in a family pedigree. A relationship linker comprising a superentity-subentity label and a relationship index of 100 indicates a 100% engagement of a subentity with a superentity. For example, it has been previously verified that a server is one of the many servers in a computational network, and the server contributes to 51% of the network workload. The relationship linker will comprise and superentity-subentity label and a relationship of 51. A relationship linker comprising a superentity-subentity label and a relationship index of 100 indicates a 100% engagement of a subentity with a superentity.

In one aspect, the system may include one or more hardware processors configured by machine-readable instructions to establish verification addresses on a block chain and perform block chain/distributed ledger-based entity identity verification of one or more entities and/or verification of relationship between one or more entities and one or more related entities using the verification addresses. In all embodiments herein, such entity identity verification and/or relationship verification is preferably multifactor, e.g., using an identify verifier, relationship verifier and another identity verifier, which may be an additional identity verifier, encrypted identity verifier, hash of an identity verifier, an assigned identity verifier, e.g., a username and/or password, password generated by an one-time password algorithm, a PIN, a card and/or a device, an SMS text, and any other multifactor identification method, a cryptographic entity private key which is paired with an entity public key, and/or a cryptographic verification private key which is paired with a verification public key. However, if desired, in all embodiments herein, a single factor entity identity verification and/or relationship verification may be performed using identity verifier(s), encrypted identity verifier(s) or hash(es) of identity verifier(s).

Establishing verification addresses on the block chain/distributed ledger may include associating entity identifiers, identity verifiers and/or relationship verifiers with entities (e.g., individuals, organizations, institutions, companies or devices) having previously verified entity identities and/or previously verified relationship between two or more entities, a first entity identifier, a first identity verifier and a first relationship verifier being associated with a first entity, the first entity having a previously verified entity identity and/or verified relationship to a related entity; assigning verification addresses on a block chain/distributed ledger to the entities, a given verification address derived from a cryptographic verification public key which is paired with a verification private key, a first verification address being assigned to the first entity, the first verification address derived from a first cryptographic verification public key(s) which is(are) paired with a first verification private key(s); and recording an entity identifier or entity identifiers, an identity verifier or identity verifiers (which in any version herein may be biometric data and/or other identity verifier(s), e.g., passport image, geographic location, state and/or federal license number and license type and/or financial account, entity private key) and/or a relationship verifier or relationship verifiers (which in any version herein may be related entity data, relationship linker data and/or other relationship verifier(s), e.g., share certificate) associated with the entities at corresponding verification addresses, the first entity identifier, the first identity verifier and the first relationship verifier associated with the first entity being recorded at the first verification address. Performing block chain/distributed ledger-based entity identity verification and/or relationship verification using the verification addresses may include receiving one or more entity identifiers, identity verifiers and/or relationship verifiers in connection with one or more requests to verify an identity of one or more entities and/or relationship between two or more entities, the first entity identifier, the first identity verifier and/or the first relationship verifier being received in connection with a request to verify an identity of the first entity and/or to verify the relationship between the first entity and a related entity; extracting the entity identifier(s), identity verifier(s) and/or relationship verifier(s) associated with the one or more entities from the corresponding verification addresses, the first entity identifier(s), the first identity verifier(s) and/or the first relationship verifier(s) associated with the first entity being extracted from the first verification address; and verifying the identity of the one or more entities and/or relationship between two or more entities upon receiving matching entity identifier data, matching identity verifier data and (or) matching relationship verifier data, the entity identity of the first entity and the relationship between the first entity and the related entity being verified upon receipt of (1) entity identifier data matching the first entity identifier data, (2) identity verifier data matching the first identity verifier data and (or) (3) relationship verifier data matching the first relationship verifier data. In some embodiments, the relationship between two entities may be cross-verified upon the receipt of the first relationship verifier data of the first entity that is logically matching the relationship verifier data of the related entity recorded in the system. In some embodiments, a relationship verifier(s) may be used as identity verifier(s) for verifying identity of an entity.

An entity may be identified at the block chain/distributed ledger level with the identity verifier(s), data of which may be biometric data and/or other unique information as noted above, e.g., including or relating to one or more of a passport, an identification card, extracted passport information, a driver's license, extracted driver's license information, and/or other information such as other government issued documentation, a private key, etc. Any other identity verifiers, data of which may include, by way of example, online behaviors, health and/or medical information as set forth more fully herein. In some embodiments, the relationship between two entities may be verified at the block chain/distributed ledger level with the relationship verifiers, data of which may be related entity data, relationship linker data, and/or other information, such as share certificate, engagement certificate, marriage certificate, etc.

Another aspect of the disclosure relates to a method for establishing verification addresses on a block chain/distributed ledger in order to provide block chain/distributed ledger-based entity identity verification and/or verification of relationship between one or more entities and one or more related entities. The method may be performed by one or more hardware processors configured by machine-readable instructions. The method may include associating entity identifiers, identity verifiers, and/or relationship verifiers with entities having previously verified entity identities and relationship between two or more entities, a first entity identifier, a first identity verifier and/or a first relationship verifier being associated with a first entity, the first entity having a previously verified entity identity and previously verified relation with a related entity; assigning verification addresses on a block chain/distributed ledger to the entities, a given verification address derived from a verification public key(s) which is(are) paired with a verification private key(s), a first verification address being assigned to the first entity, the first verification address derived from a first verification public key which is paired with a first verification private key; and recording entity identifier(s)), identity verifier data (identity verifier(s)) and/or relationship verifier data (relationship verifier(s)) associated with the entities at corresponding verification addresses, the first entity identifier, first identifier data and/or first relationship verifier data associated with the first entity being recorded at the first verification address. The identity of the one or more entities and/or the relationship between two or more entities may be verifiable upon receiving matching entity identifier data, identity verifier data (e.g., driver's license data and/or biometric data, state and/or federal license number and license type and/or financial account data) and/or matching relationship verifier data (e.g. related entity data, relationship linker data) such that the entity identity of the first entity and the relationship between the first entity and the related entity is verifiable upon receipt of (1) entity identifier data matching the first entity identifier data, (2) identity verifier data matching the first identity verifier data and (3) relationship verifier data matching the first relationship verifier data. In some embodiments, the relationship between two entities may be cross-verified upon the receipt of the first relationship verifier data of the first entity logically matching the relationship verifier data of the related entity recorded in the system. In some embodiments, a relationship verifier(s) may be used as identity verifier(s) for verifying identity of an entity.

Yet another aspect of the disclosure relates to a method for performing block chain/distributed ledger-based entity identity verification of one or more entities and/or verification of relationship between one or more entities and one or more related entities using verification addresses. The method may be performed by one or more hardware processors configured by machine-readable instructions. The method may include receiving one or more verification addresses in connection with one or more requests to verify an identity of one or more entities and/or to verify a relationship between two or more entities, a first verification address being received in connection with a request to verify an identity of a first entity and/or a request to verify a relationship between the first entity and the related entity; extracting entity identifier data (such as entity identifier(s)), identity verification data (such as identity verifier(s) e.g., biometric and/or other identity verifier(s) e.g., passport image, geographic location, state and/or federal license number and license type and/or financial account, entity public key such as an entity public key paired with an entity private key), and/or relationship verifier data (relationship verifier(s) e.g. related entity, relationship linker, share certificate) associated with the one or more entities from corresponding verification addresses on a block chain/distributed ledger, a given verification address derived from a verification public key(s) which is(are) paired with a verification private key(s), first entity identifier data (such as entity identifier(s)), first identity verifier data (such as identity verifier(s) e.g., biometric, state and/or federal license number, entity public key), and/or relationship verifier data (such as relationship verifier(s), e.g. related entity, relationship linker, share certificate) associated with the first entity being extracted from a first verification address assigned to the first entity, the first verification address derived from a first verification public key(s) which is(are) paired with a first verification private key(s); and verifying the identity of the first entity and/or verifying the relationship between the first entity and a related entity upon receiving matching entity identifier data, matching identity verifier data, and/or matching relationship verifier data, being verified upon receipt of (1) entity identifier data matching the first entity identifier data, (2) identity verifier data matching the first identity verifier data and (or) (3) relationship verifier data matching the first relationship verifier data. In some embodiments, the relationship between two entities may be cross-verified upon the receipt of by the first relationship verifier data of the first entity logically matching the relationship verifier data of the related entity recorded in the system. In some embodiments, a relationship verifier(s) may be used as identity verifier(s) for verifying identity of an entity.

In other embodiments, the system may be for providing block chain or distributed ledger-based entity identity verification and/or verification of relationship between one or more entities and one or more related entities, the system may include: one or more computer-readable storage media configured to store a block chain or distributed ledger; a server-side computer system comprising one or more processors programmed to execute computer program instructions that, when executed, cause the server-side computer system to: assign a verification address associated with the block chain or distributed ledger to an entity, the entity having a previously verified entity identity and/or having a previously verified relationship to one or more related entities, store, at one or more computer-readable storage media, an entity identifier of the entity, entity verifier data and/or relationship verifier data of the in association with the verification address associated with the block chain or distributed ledger, wherein the entity identifier, entity identifier data, identity verifier, identity verifier data, relationship verifier, relationship verifier data and the verification addresses are different from one another and different from the verification private key and the verification public key from which the verification address was derived, obtain, from a client-side device, the request indicating the verification address associated with the block chain, the entity identifier, the entity identifier data, the identity verifier, the identity verifier data, the relationship verifier and the relationship verifier data in connection with a request to verify the entity's identity and/or to verify its relationship to one or more related entities; obtain, the stored entity identifier, the stored entity identifier data, the stored identity verifier, the stored identity verifier data, the stored relationship verifier, the stored verifier data using the verification address indicated in the request, and sign the verification of the entity's identity and/or the verification of the entity's relationship to one or more related entities responsive to a determination that the entity identifier of the request, the entity identifier data of the request, the identity verifier of the request, the identity verifier data of the request, the relationship verifier of the request and the relationship verifier data of the request match the stored entity identifier, the stored entity identifier data, the stored identity verifier, the stored identity verifier data, the stored relationship verifier and the stored relationship verifier data. In some embodiments, the relationship between two entities may be cross-verified upon the receipt of by the stored relationship verifier data of the entity logically matching the stored relationship verifier data of the related entity.

In the system, additional variations include the following: the entity may be an individual, a device, a business, a government, or a government agency. The identity verifier data may be encrypted data of another identity verifier and/or a hash of another identity verifier. The server-side computer system may be caused to sign, using the verification private key which matches the verification public key from which the verification address was derived, the verification of the entity's identity and/or the verification of the entity's relationship to one and more related entities responsive to the determination that the entity identifier of the request, the entity identifier data of the request, the identity verifier of the request, the identity verifier data of the request, the relationship verifier of the request, the relationship verifier data of the request match the stored entity identifier, the stored entity identifier data, the stored identity verifier, the stored identity verifier data, the stored relationship verifier and the stored relationship verifier data.

The system server-side computer system may be caused to: store, at the one or more computer-readable storage media, one of more verification private keys in association with the verification address associated with the block chain or distributed ledger; obtain, from the client-side device, the entity public key, the entity private key(s) and/or the entity's verification private keys in connection with the request to verify the entity's identity and/or verification of the entity's relationship to one or more elated entities; obtain the stored verification private key using the verification address indicated in the request; and sign, using the verification private key, the verification of the entity's identity and/or verification of the entity's relationship to one or more related entities responsive to a determination that the entity identifier of the request, the entity identifier data of the request, the identity verifier of the request, the identity verifier data of the request, the relationship verifier of the request, the relationship verifier data of the request match the stored entity identifier of the request, the stored entity identifier data of the request, stored identity verifier of the request, stored identity verifier data of the request, the stored relationship verifier of the request, the stored relationship verifier data of the request. In a variation, the private key(s) (e.g., entity private key(s), verification private key(s)) may also be stored on the client-side device, and the client-side device may be a user device associated with the entity.

The system server-side computer system may be caused to: assign another verification address associated with the block chain or distributed ledger to the individual; store, at the one or more computer-readable storage media, further identity verification data of the entity and/or further relationship verification data of the entity in association with the other verification address associated with the block chain or distributed ledger, the further identity verification data and/or further relationship verification data being an encrypted data of another identity verification data and/or another relationship verification data and/or the further identity verification data or further relationship verification data being a hash or hashes of another identity verification data or another relationship verification data; obtain, from the client-side device, the further identity verifier data and/or further relationship verifier data in connection with the request to verify the entity's identity and/or the verification of the entity's relationship to its related entity(ies), the request further indicating the other verification address associated with the block chain or distributed ledger; obtain the stored further identity verifier data and/or further relationship verifier data, which may be encrypted and/or hashed, using the other verification address indicated in the request; and sign the verification of the entity's identity and/or the verification of the entity's relationship to its related entity(ies) responsive to a determination that the entity identifier of the request, the identity verifier data of the request, the relationship verifier data of the request, the further encrypted/hashed identity verifier data of the request, and the further encrypted/hashed relationship verifier data of the request match the stored entity identifier, the stored identity verifier data, the stored relationship verifier data, the stored further encrypted/hashed identity verifier data, and the stored further encrypted/hashed relationship verifier data.

The system server-side computer may be caused to obtain, via a user interface, a user-initiated command to add the other verification address as an address of the block chain or distributed ledger for the entity and assign the other verification address associated with the block chain or distributed ledger to the entity based on the user-initiated command.

The system server-side computer system may be caused to obtain, via a user interface, a user-initiated command to remove the other verification address as an address of the block chain or distributed ledger for the entity, and de-associate the other verification address associated with the block chain or the distributed ledger from the entity based on the user-initiated command.

The system server may provide a first user, different from the entity, access to data stored at the one or more computer-readable storage media in association with the verification address associated with the block chain or distributed ledger, the first user being provided access to the stored data based on verification that the first user has a first user private key or a first pair of cryptographic user public key and private key, the first user public key and the first user private key being different from the verification public key and verification private key, and deny a second user, different from the entity, access to the stored data based on verification that the second user has a second user private key.

The identity verifier data may be biometric data in a form such as an image, a recording, a template or a biometric vector, and may be biometric data related to a fingerprint, palm veins, face recognition, DNA sequences, palm print, hand geometry, iris recognition, retina, odor, gait, voice, etc.

In another embodiment, there is a system for providing block chain or distributed ledger-based verification of entity identity and/or verification of relationship between one or more entities and one or more related entities, the system may include: one or more computer-readable storage media configured to store a block chain or distributed ledger; a server-side computer system comprising one or more processors programmed to execute computer program instructions that, when executed, cause the server-side computer system to: assign multiple verification addresses of the block chain or distributed ledger to the entity, the entity having a previously verified entity identity and/or a previously verified relationship to one or more related entities, the multiple verification addresses include a first verification address associated with the block chain or distributed ledger and a second verification address associated with the block chain or distributed ledger; store, at the one or more computer-readable storage media, (i) an entity identifier of the entity, first identity verifier data of the entity, and first relationship verifier data in association with the first verification address associated with the block chain or distributed ledger and (ii) a second identity verifier data of the entity and second relationship verifier data in association with the second verification address associated with the block chain or distributed ledger, wherein the first identity verifier data of the entity, the second identity verifier data of the entity, the first relationship verifier data of the entity, the second relationship verifier data of the entity are different from one another, different from first verification private key and first verification public key from which the first verification address was derived, and different from second verification private key and second verification public key from which the second verification address was derived; obtain, from a client-side device, the entity identifier, the first identity verifier data, the second identity verifier data, the first relationship verifier data, and the second relationship verifier data in connection with a request to verify the entity's identity and/or to verify the entity's relationship to one or more related entities, the request indicating the first verification address associated with the block chain distributed ledger, and the second verification address associated with the block chain or distributed ledger; obtain (i) the stored entity identifier, the stored first identity verifier data, and the stored first relationship verifier data using the first verification address indicated in the request and (ii) the stored second identity verifier data, and the stored second relationship verifier data using the second verification address indicated in the request; and sign, using the verification private key, verification of the entity's identity responsive to a determination that the entity identifier of the request, the first identity verifier data of the request, the first relationship verifier of the request, the second identity verifier data of the request, and the second relationship verifier of the request match the stored entity identifier, the stored first identity verifier data, the stored first relationship verifier data, the stored second identity verifier data, and the stored second relationship verifier data; provide a first user, different from the individual, access to data stored at the one or more computer-readable storage media in association with the first verification address associated with the blockchain, the first user being provided access to the stored data based on verification that the first user has a first access private key which is paired with a first access public key, the first access private key and the first access public key being different the first verification private key and the first verification public key from which the first verification address was derived and different from the second verification private key and the second verification public key from which the second verification address was derived; and deny a second user, different from the entity, access to the stored data based on verification that the second user has a second access private key.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for illustration and description only and are not intended as a definition of the limits of the invention. As used in the specification and in the claims, the singular form of "a", "an", and "the" include plurals unless the context clearly dictates otherwise.

An entity may be an individual, a company/business or a device, e.g., a smart phone, a computer, or any other device such as an RFID tag.

Entity identity may be a unique or substantially unique identity of an entity within a group or set of entities, such as all individuals, or all smart phones, or all smart phones located in a predetermined geographic location, or all individuals working in a particular company or government or government agency.

As used herein, "data" is defined as anything electronically stored be it image, photograph, text, sound, video, or a combination thereof, and whether a raw file or a manipulated image such as a hash, or raw text or manipulated text such as a hash or other function. Data may encompass data stored as one file or as multiple files.

As used herein, "correspond" or "corresponds to" means an exact match of data or a match of derivative/manipulated versions of data, e.g., where the system compares a hash or other derived data from the stored data and/or from the inputted data to make its comparison.

DETAILED DESCRIPTION

Figure 1:
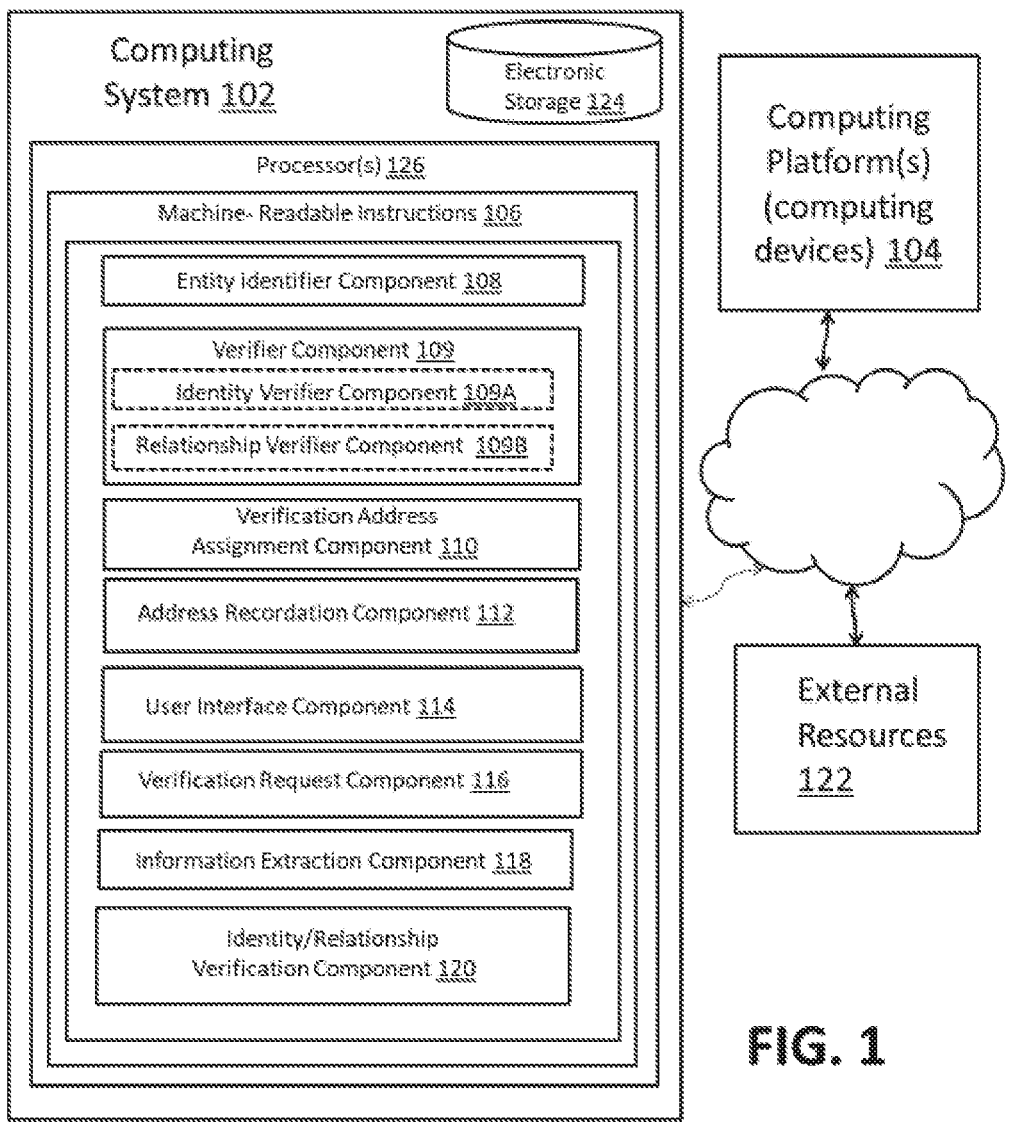
FIG. 1 illustrates a system for providing block chain/distributed ledger-based verification of entity identity and/or verification of relationship between two or more entities, in accordance with one or more implementations.

FIG. 1 illustrates an overall system for providing block chain/distributed ledger-based entity identity verification and/or relationship verification, in accordance with one or more implementations. In some implementations, the overall system may include one or more computing system(s) 102. Computing system(s) 102 may be a server or servers, or it may be configured as a "smart contract" (such as by use of Ethereum "smart contract" or decentralized application) and/or as a combination of a server or servers and decentralized application(s). Computing system(s) 102 may be configured to communicate with one or more computing platforms 104 according to a client/server architecture, a peer-to-peer architecture, and/or other architectures. The users may access computing system(s) 102 via computing platform(s) 104 (computing devices such as desktop computers, laptops, smartphones, smart devices, or any other electronic device, etc).

The computing system(s) 102 may be configured to execute machine-readable instructions 106. The machine-readable instructions 106 may include one or more of an entity identifier component 108, verifier component 109 including an identity verifier component 109A and a relationship verifier component 109B, a verification address assignment component 110, an address recordation component 112, a user interface component 114, a verification request component 116, an information extraction component 118, an identity verification component 120, and/or other machine-readable instruction components. The machine-readable instructions 106 may be executable to establish verification addresses on a block chain/distributed ledger. Generally speaking a block chain is a transaction database shared by some or all nodes participating in the overall system. Such participation may be based on the Bitcoin protocol, Ethereum protocol, and/or other protocols related to digital currencies, block chains and/or distributed ledgers. In addition to transactions, other information may be contained by the block chain or the distributed ledger, such as described further herein.

The block chain may be based on several blocks. A block may include a record that contains and confirms one or more waiting transactions. Periodically (e.g., roughly every minute), a new block including transactions and/or other information may be appended to the block chain. In some implementations, a given block in the block chain contains a hash of the previous block. This may have the effect of creating a chain of blocks from a genesis block (i.e., the first block in the block chain) to a current block. The given block may be guaranteed to come chronologically after a previous block because the previous block's hash would otherwise not be known. The given block may be computationally impractical to modify once it is included in the block chain because every block after it would also have to be regenerated.

A distributed ledger can be a database or replicas of a database that are shared and synchronized across a distributed network or networks. The distributed ledger allows transactions to be publicly or privately viewable and replicated, making a cyberattack more difficult. The distributed ledger can also maintain consensus about the existence and status of shared facts in trustless environments (i.e. when the participants hosting the shared database are independent actors that don't trust each other). Consensus is not a unique feature of distributed ledger per se: other distributed databases also use consensus algorithms such as Paxos or Raft. Same for immutability: immutable databases exist outside DL (Google HDFS, Zebra, CouchDB, Datomic, etc.).

The distributed ledger can vary from a general distributed database as follows: (a) the control of the read/write access is truly decentralized and not logically centralized as for other distributed databases; and (b) (as a result of (a)), there is an ability to secure transactions in competing environments, without trusted third parties. Distributed ledger structures can be linear, such as blockchain, or incorporate Directed Acyclic Graphs (DAG), such as Iota Tangle. Blockchain Iota Tangle, and Hedera hashgraph, are specific instances of a distributed ledger, having predefined formats and access protocols.

Block chain is a distributed ledger that chronologically stores transactions. In a block chain ledger, all transactions are periodically verified and stored in a "block" that is linked to the preceding block via a cryptographic hash. The block chain ledger is publicly viewable, allowing the general public to view and keep track of transactions. Each network node can receive and maintain a copy of the block chain. However, public or private block chains may be used.

A given verification address may include a specific location on the block chain where certain information is stored. In some implementations, an individual verification address may be referred to as an "AtenVerify Address." Verification addresses are further described below in connection with verification address assignment component 110.

The individual identifier component 108 (or entity identifier component) may be configured to associate entity identifiers with individual entities (or any entity or any individual acting on behalf of an entity) having previously verified identities or any entity with a verified entity identity. An entity may be a person, a company, an organization, institution, a government (or government agency), a living thing or asset, a tangible or intangible thing or asset and/or a thing in the internet of things. For example, a first entity identifier may be associated a first entity or any other entity. The first entity may have a previously verified entity identity. Generally speaking an entity identifier may include one or more of a number, an alphanumeric code, a username, and/or other information that can be linked to an individual or entity. The system or the user may select the first entity identifier and the system assigns it to the user, i.e., a first identifier. In some implementations, such an entity identifier may be referred to as an "Aten ID."

The verifier component 109 (having an identity verifier component 109A and a relationship verifier component 109B) may be configured to associate identity verifiers and relationship verifiers with individual entities (or any entity or any person acting on behalf of an entity) having previously verified identities and/or previously verified relationship(s) with related entities. An identity verifier may be a digital index assigned by a system for identifying storage location(s) of an item or items of identity verification data, and used as an identity verifier for the express purpose of verifying identity of an entity recorded in the system. A relationship verifier may be a digital index assigned by a system for identifying storage location(s) of a set of relationship verification data associated with an entity, and used as relationship verifiers for the express purpose of verifying relationship between two or more entities recorded in the system. In accordance with some implementations, an entity with a previously verified identity may have obtained the previously verified entity identity through a variety of approaches. For example, in some implementations the entity (e.g., an individual) may be required to provide evidence of the entity's identity. Such evidence may include a wide variety of information, such as one or more of providing a copy of a government issued identification (e.g., passport and/or driver's license), providing a copy of mail received by the individual (e.g., a utility bill), evidence provided by a third party, and/or other evidence of an individual's identity. Evidence for a device, e.g., may be the device ID provided by connection to the device, a user manual, and/or a serial number. Evidence for a business may be a business certificate, a bank statement, a credit card statement, invoices, mail received by the business, and/or other evidence of business identity. The evidence may be provided to an organization associated with server(s) 102. In accordance with some implementations, an entity with a previously verified relationship to one or more related entities may have obtained the previously verified relationship through a variety of approaches. A relationship between two or more entities may be any types of relationship, such as ownership, engagement, social relationship, ancestry relationship, genetic relationship, superentity-subentity relationship, etc. For example, in some implementations the entity may be required to provide evidence of ownership of a related entity. Such evidence may include a wide variety of information, such as one or more of providing a copy of ownership certificate (e.g., share certificate), providing a copy of purchase receipt, evidence provided by a third party, and/or other evidence of the entity's ownership. Evidence for engagement with a related entity, e.g., may be employment contract, marriage certificate, evidence provided by a third party, and/or other evidence of the entity's ownership. Evidence for social relationship, e.g., may be mutual declaration of a social relationship between two entities, evidence provided by a social media and/or social networking service company (e.g., Facebook®, Twitter®, Whatsapp®), evidence provided by a third party, and/or other evidence of the entity's social relationship. The evidence of any relationship may be provided to an organization associated with server(s) 102. In some implementations, a relationship verifier(s) may be used as identity verifier(s) for verifying identity of an entity. When using relationship data to verify an entity's identity, the system may base on the stored relationship verifier data of the entity to generate one or more relationship-based answering requests. An entity's identity is verified upon the receipt of correct answers from the entity for the relationship-based answering requests. For example, a person may request the system to use one or more his/her relationship verifier(s) to verify his/her identity. After receiving the request, the system may extract the stored the person's entity identifier recorded in the system at the verification address submitted for an identity verification request, and subsequently extracts all the stored relationship verifier data (such as the ownership data (e.g., entity identifiers and names of the entity's assets), the family relationship data (e.g., entity identifiers and names of the entity's family members), etc.) associated with the entity identifier. The extracted relationship verifier data may be recorded at one or more verification addresses associated with the entity identifier. The system may then use the extracted relationship verifier data to generate one or more relationship-based answering requests (e.g., entering entity identifiers or names of three of the entity's assets which were registered in the system, and entering the entity identifiers or names of three of the entity's family members whom were registered in the system), and provide the answering request(s) to the entity for answering. The entity is then required to enter correct answers and submit the answers to the system. Upon a receipt of entity's answer(s) (e.g., three entity identifiers of the entity's assets registered in the system and three names of the entity's family members registered in the system) matching the stored relationship verifier data of the entity, the entity's identity is verified. The use of relationship verifier(s) for identity verification is particularly useful when the entity is not able to provide the required identity verifier data (e.g., biometric data, entity private key) at the time of identity verification or when an entity lost one or more of his/her/its identity verifier data that is required for identity verification.

The verification address assignment component 110 may be configured to assign verification addresses on a block chain/distributed ledger to the individuals or other entities. A given verification address may be derived from a verification public key which is paired with a verification private key. By way of example, a first verification address may be assigned to the first entity. The first verification address may be derived from a first verification public key which is paired with a first verification private key.

Generally speaking a public and private key-pair may be used for encryption and decryption according to one or more public key algorithms. By way of non-limiting example, a key pair may be used for digital signatures. Such a key pair may include a verification private key for signing and a verification public key for verification. The verification address and the verification public key may be widely distributed, while the verification private key is kept secret (e.g., known only to its proprietor). The keys may be related mathematically but calculating the private key from the public key is unfeasible.

In some implementations, verification address assignment component 110 may be configured such that verification private keys may be stored within computing platform(s) 104. For example, the first verification private key may be stored within a computing platform 104 and/or other locations associated with the first entity. In accordance with some implementation, a verification private key may be stored in one or more of a "verify.dat" file, a SIM card, and/or other locations.

In some implementations, verification address assignment component 110 may be configured such that multiple verification addresses may be assigned to separate entities. For example, in addition to the first verification address, a second verification address may be assigned to the first entity. One or more additional verification addresses may be assigned to the first entity, in accordance with one or more implementations.

Generally speaking it is not necessary to assign verification address(es) to individual relationships between an entity and a related entity for relationship verification. An entity's relationship to a related entity may be verified after matching relationship verifier data submitted by an entity and relationship verifier data stored in the system, and verification of the entity's identity. An entity's relationship to a related entity may be further cross-verified after logically matching the stored relationship verifiers of the entity with the stored relationship verifiers of the related entity's identity in the system, and verification of the entity's identity and the related entity's identity. In some implementations, verification address assignment component 110 may be configured such that multiple verification addresses may be assigned to an entity's individual relationships with different related entities for the express purpose of verification of a particular relationship. For example, in addition to the first verification address, a second verification address may be assigned to the entity's first relationship to a related entity.

One or more additional verification addresses may be assigned to the first relationship, in accordance with one or more implementations.

The address recordation component 112 may be configured to record entity identifiers and identity verifier data (e.g., driver's license data, biometric data, a biometric hash, state and/or federal license number, entity public key), and/or relationship verifier data (e.g. related entity data, relationship linker data, share certificate) associated with the entities at corresponding verification addresses. For example, the first entity identifier, first identity verifier data and first relationship verifier data associated with the first entity may be recorded at the first verification address.

Recording information at a given verification address may include recording a hash or other encrypted representation of the information. In some implementations, different identity verifier data and relationship verifier data may be recorded at multiple verification addresses assigned to a single given entity. For example, in addition to the first entity identifier, the first identity verifier data and/or first relationship verifier data associated with the first entity being recorded at the first verification address, the first entity identifier, second identity verifier data and/or second relationship verifier data associated with the first entity may be recorded at a second verification address.

Identity verifier data and relationship verifier data may be received via computing platforms 104 associated with the entities. For example, identity verifier data and relationship verifier data associated with a first entity may be received via a first computing platform 104 associated with the first entity. When the identity verifier data is biometric data to upload, the first computing platform 104 may include an input device (not depicted) configured to capture and/or record a physiological characteristic and/or behavioral characteristic of the first entity. Examples of such an input device, typically for an entity that is an individual, or a government or business acting through an individual, may include one or more of a camera and/or other imaging device, a fingerprint scanner, a microphone, an accelerometer, and/or other input devices. The user interface component 114 may be configured to provide an interface for presentation to entities via associated computing platforms 104. The interface may include a graphical user interface presented via the entities' computing platforms 104. According to some implementations, the interface may be configured to allow a given entity to add or delete verification addresses assigned to the given entity so long as at least one verification address is assigned to the given entity.

In some implementations, user interface component 114 may be configured to access and/or manage one or more user profiles and/or user information associated with users of system 100. The one or more user profiles and/or user information may include information stored by server(s) 102, one or more of the computing platform(s) 104, and/or other storage locations. The user profiles may include, for example, information identifying users (e.g., a username or handle, a number, an identifier, and/or other identifying information), security login information (e.g., a login code or password), system account information, subscription information, digital currency account information (e.g., related to currency held in credit for a user), relationship information (e.g., information related to relationships between users in system 100), system usage information, demographic information associated with users, interaction history among users in the system 100, information stated by users, purchase information of users, browsing history of users, a computing platform identification associated with a user, a phone number associated with a user, and/or other information related to users.

In some implementations, user interface component 114 may be configured to generate one or more pairs of cryptographic public key and private key. The public key may be used as an entity public key, and the private key may be used as an entity private key for an entity using the system of 100. The one or more entity public keys may be stored by server(s) 102, one or more of the computing platform(s) 104, and/or other storage locations. One or more entity public keys may be associated with one or more verification address, and used as an identity verifier for making a verification request. One or more entity private keys, which were paired with one or more entity public keys, may be used as the entity's approval(s) for making a verification request.

In some implementations, user interface component 114 may be configured to generate one or more pairs of cryptographic public key and private key. The public key may be used as a user public key, and the private key may be used as a user private key for an entity using the system of 100. The one or more user public keys may be stored by server(s) 102, one or more of the computing platform(s) 104, and/or other storage locations. One or more user public keys may be associated with one or more verification address, and used as a user verifier for making a request to access to data stored at the one or more computer-readable storage media in association with the verification address. One or more entity user private keys, which were paired with one or more user public keys, may be used as the user's approval(s) for making a request to access to the data. The machine-readable instructions 106 may be executable to perform block chain-based or distributed ledger-based verification of entity identity and/or verification of entity's relationship to one or more related entity using the verification addresses. The verification request component 116 may be configured to receive one or more entity identifiers in connection with one or more requests to verify an identity of one or more entities or in connection with one or more requests to verify one or more relationship between one or more entities and one or more related entities. For example, the first entity identifier may be received in connection with a request to verify an identity of the first entity, and the second entity identifier may be received in connection with a request to verify relationship between the first entity and a related entity. Requests for identity verification and/or relationship verification (e.g., ownership verification of an asset) may be provided in connection with and/or related to financial transactions, information exchanges, and/or other interactions. Requests may be received from other entities and/or other third parties.

The information extraction component 118 may be configured to extract identity verifier data (e.g., drivers' license, biometric data, state and/or federal license number, and/or entity public key), and/or relationship verifier data (e.g., related entity data, relationship linker data and/or share certificate) associated with the one or more entities from the corresponding verification addresses. For example, the first identity verifier data (e.g., driver's license data, biometric data, state and/or federal license number, and/or entity public key), first relationship verifier data (e.g., related entity data, relationship data and/or share certificate) associated with the first entity may be extracted from the first verification address. Extracting information (e.g., driver's license or biometric data) from a verification address may include decrypting information.

According to some implementations, information extraction component 118 may be configured such that, responsive to receiving the request to verify the identity of the first entity and/or to verify the first entity's relationship to one or more related entities, a prompt may be provided to the first entity for identity verifier(s) matching the first identity verifier data (e.g., driver's license data, biometric data, state and/or federal license number, and/or entity public key) and/or relationship verifier(s) matching relationship verifier data (e.g., related entity data, relationship linker data and/or share certificate). The prompt may be conveyed via a computing platform 104 associated with the first entity. The prompt may be conveyed via a graphical user interface and/or other user interface provided by the computing platform 104 associated with the first entity. The prompt may include an indication that is one or more of visual, audible, haptic, and/or other indications.

In some implementations, information extraction component 118 may be configured such that, responsive to receiving the request to verify the identity of the first entity and/or verify the identity of the first entity and the relationship between the first entity and one or more related entities, a prompt may be provided to a computing platform 104 associated with the first entity. The prompt may cause computing platform 104 to automatically provide, to server(s) 102, identity verifier data matching the first identity verifier data, and/or relationship verifier data matching the first relationship verifier data.

The identity verification component 120 may be configured to verify the identity of the one or more entities upon and/or verify relationship between the one or more entities and one or more related entities, or in response to, receiving matching identity verifier data (e.g., driver's license data, biometric data, state and/or federal license number, and/or entity private key), matching relationship verifier data (e.g., related entity data, relationship linker data and/or share certificate). For example, the entity identity of the first entity may be verified upon receipt of (1) identity verifier data matching the first identity verifier data and (2) relationship verifier data matching the first relationship verifier data. Verifying the entity identity of the first entity and/or verifying the first entity's relationship to one or more related entities may include comparing stored information with newly received information. In some implementations, component 120 may be configured to cross-verify the relationship between two or more entities. A relationship between two entities may be cross-verified upon the receipt of the first relationship verifier data of the first entity logically matching the relationship verifier data of the related entity recorded in the system.

According to some implementations, identity/verification component 120 may be configured such that the entity identity of the first entity and/or the first entity's relationship to one or more related entities may be verified upon receipt of (1) identity verifier data matching the first identity verifier data and/or the second identity verifier data, and (2) relationship verifier data matching the first relationship verifier data or the second relationship verifier data. In some implementations, the second identity verifier may be the first entity's private key (e.g. entity private key). Its associated public key may be used as one of the public keys for creating a verification address. Such implementations may provide so-called "M-of-N" signatures for identity verification where some subset of a larger set of identifying information is required.

In some implementations, identity verification component 120 may be configured to sign, using the verification private key which matches the verification public key from which the verification address was derived, the verification of the first entity's identity or the first entity's relationship to one or more related entities responsive to the determination that the entity identifier of the request, the identity verifier data of the request, and the relationship verifier data of the request match the first entity identifier, and the first identity verifier data, and the first relationship verifier data.

A cryptographic signature is a mathematical mechanism that allows someone to prove ownership. In the case of Bitcoin, a Bitcoin wallet and its private key(s) are linked by some mathematical magic. When your Bitcoin software signs a transaction with the appropriate private key, the whole network can see that the signature matches the bitcoins being spent. However, there is no way for the world to guess your private key to steal your hard-earned bitcoins.

In some implementations, at least one dedicated node performs the signing of the verification of the entity identity of the first entity and/or verification of the first entity's relationship to one or more related entities. A given dedicated node may include one or more of the server(s) 102. The given dedicated node may be a public node or a private node configured for creating new blocks and/or for signing verification.

In some implementations, server(s) 102, computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 122 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 122, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 122 may include sources of information, hosts and/or providers of virtual environments outside of system 100, external entities participating with system 100, and/or other resources. In some implementations, some or all of the functionality attributed herein to external resources 100 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. The processor(s) 126 may be configured to execute machine-readable instruction components 108, 109 (including 109A, 109B), 110, 112, 114, 116, 118, 120, and/or other machine readable instruction components. Processor(s) 126 may be configured to execute machine-readable instruction components 108, 109, 110, 112, 114, 116, 118, 120, and/or other machine-readable instruction components by software; hardware; firmware; some combination of software, hardware, and/or firmware; and/or other mechanisms for configuring processing capabilities on processor(s) 126. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 109, 110, 112, 114, 116, 118, and 120 are illustrated in FIG. 1 as being implemented within a single processing unit, in implementations in which processor(s) 126 includes multiple processing units, one or more of machine-readable instruction components 108, 109, 110, 112, 114, 116, 118, and/or 120 may be implemented remotely from the other machine-readable instruction components. The description of the functionality provided by the different machine-readable instruction components 108, 109, 110, 112, 114, 116, 118, and/or 120 described below is for illustrative purposes, and is not intended to be limiting, as any of machine-readable instruction components 108, 109, 110, 112, 114, 116, 118, and/or 120 may provide more or less functionality than is described. For example, one or more of machine-readable instruction components 108, 109, 110, 112, 114, 116, 118, and/or 120 may be eliminated, and some or all of its functionality may be provided by other ones of machine-readable instruction components 108, 109, 110, 112, 114, 116, 118, and/or 120. As another example, processor(s) 126 may be configured to execute one or more additional machine-readable instruction components that may perform some or all of the functionality attributed below to one of machine-readable instruction components 108, 109, 110, 112, 114, 116, 118, and/or 120.

Figure 2:
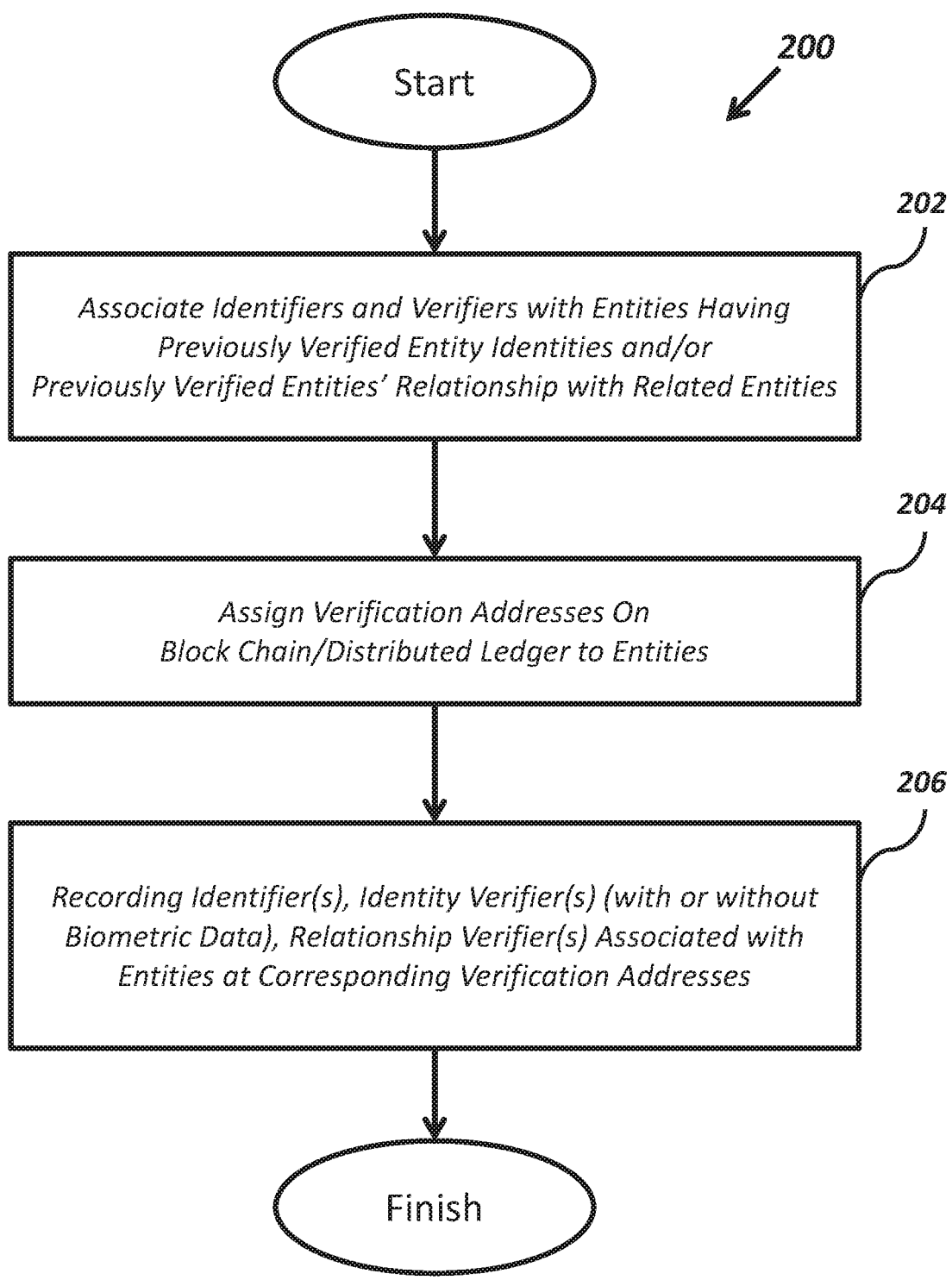
FIG. 2 illustrates a method for establishing verification addresses on a block chain/distributed ledger in order to provide block chain/distributed ledger-based verification of entity identity and/or verification of relationship between two or more entities, in accordance with one or more implementations.

FIG. 2 illustrates a method 200 for establishing verification addresses on a block chain in order to provide block chain/distributed ledger-based verification of entity identity and/or verification of relationship between two or more entities, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, one or more operations of method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, entity identifiers, identity verifiers and relationship verifiers may be associated with entities having previously verified identities and/or previously verified relationship between two or more entities. A first entity identifier, a first identity verifier and a first relationship verifier may be associated a first entity. The first entity may have a previously verified entity identity, and/or a previously verified relationship to one or more related entities. Operation 202 may be performed by one or more hardware processors configured to execute a machine-readable instruction component that is the same as or similar to individual identifier component 108 (entity identifier component) and individual verifier component 109 (identity verifier and relationship verifier component) (as described in connection with FIG. 1), in accordance with one or more implementations.

At an operation 204, verification addresses on a block chain/distributed ledger may be assigned to the entities (e.g., individuals, businesses/companies, governments/agencies and/or devices). A given verification address may be derived from a verification public key which is paired with a verification private key. A first verification address may be assigned to the first entity. The first verification address may be derived from a first verification public key which is paired with a first verification private key. Operation 204 may be performed by one or more hardware processors configured to execute a machine readable instruction component that is the same as or similar to verification address assignment component 110 (as described in connection with FIG. 1), in accordance with one or more implementations.

At an operation 206, entity identifier(s), identity verifier data (e.g., driver's license data, biometric data, state and/or federal license number, and/or entity public key(s) paired to an entity private key(s)), and/or relationship verifier data (e.g. related entity data, relationship linker data and/or share certificate) associated with the entities may be recorded at corresponding verification addresses. The first entity identifier, first identity verifier data (e.g., driver's license data, biometric data, state and/or federal license number, and/or entity public key(s) paired to an entity private key(s)), and first relationship verifier data (e.g. related entity data, relationship linker data and/or share certificate) associated with the first entity may be recorded at the first verification address. The identity of the one or more entities may be verifiable upon, or in response to, receiving matching identity verifier data (e.g., driver's license data, biometric data, and/or entity private key(s) paired to the stored entity public key(s)), and matching relationship verifier data (e.g., related entity data, relationship linker data and/or share certificate). The entity identity of the first entity may be verifiable upon, or in response to, receipt of (1) entity verifier data (e.g., driver's license data, biometric data, state and/or federal license number, and/or entity private key(s) paired to the stored entity public key(s)) matching the first entity verifier data (e.g., driver's license data, biometric data, state and/or federal license number, and/or entity public key(s) paired to an entity private key(s)), and (2) relationship verifier data (e.g., related entity data, relationship linker data and/or share certificate) matching the first relationship verifier data (e.g., related entity data, relationship linker data and/or share certificate). Operation 206 may be performed by one or more hardware processors configured to execute a machine-readable instruction component that is the same as or similar to address recordation component 112 (as described in connection with FIG. 1), in accordance with one or more implementations.

Figure 3:
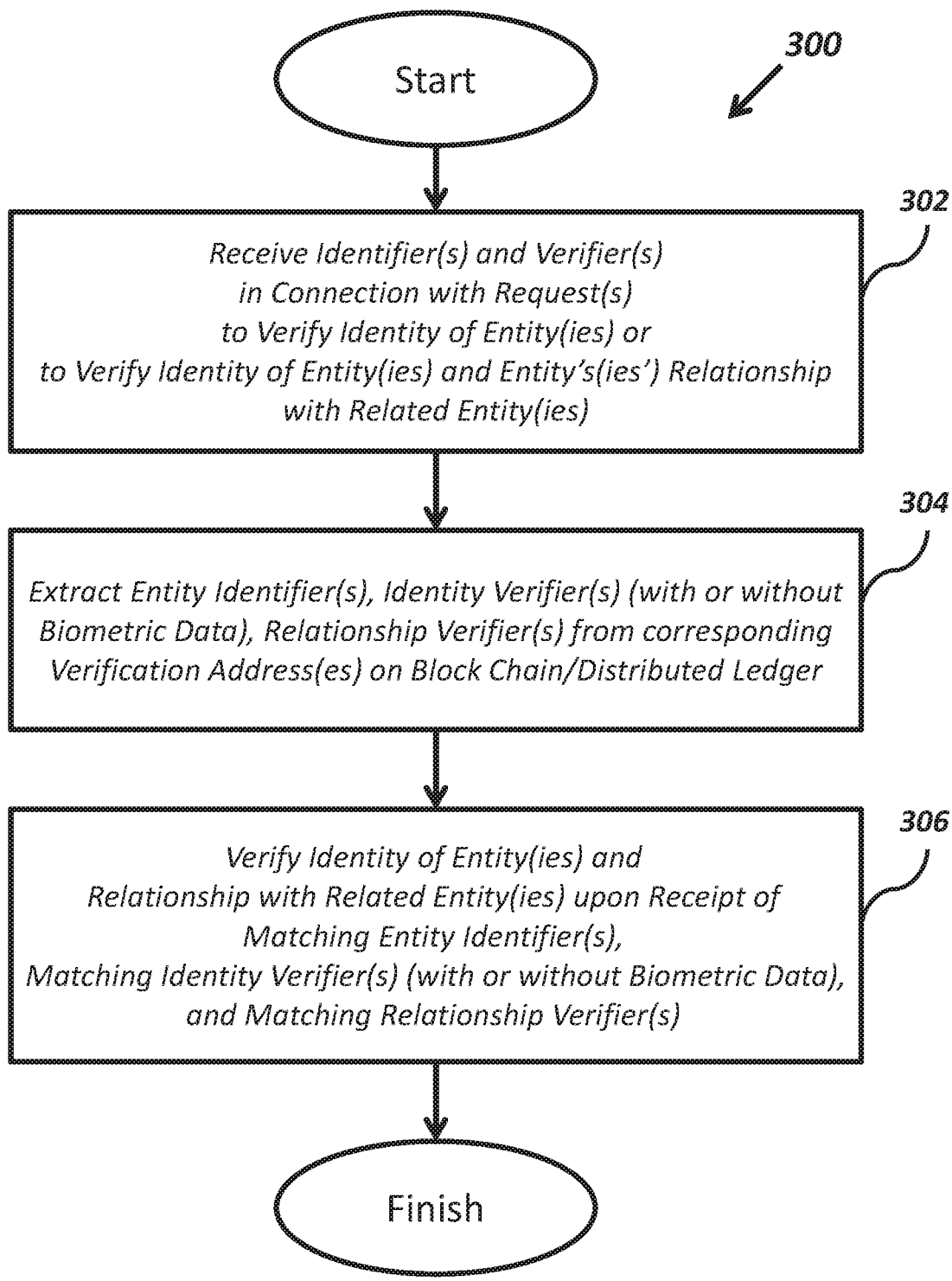
FIG. 3 illustrates a method for performing block chain/distributed ledger-based verification of entity identity and/or verification of relationship between two or more entities using verification addresses, in accordance with one or more implementations.

FIG. 3 illustrates a method 300 for performing block chain/distributed ledger-based verification of entity identity and/or verification of entity's relationship to one or more related entities using verification addresses, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, one or more identifiers may be received in connection with one or more requests to verify an identity of one or more entities. A first identifier may be received in connection with a request to verify an identity of a first entity. Operation 302 may be performed by one or more hardware processors configured to execute a machine-readable instruction component that is the same as or similar to verification request component 116 (as described in connection with FIG. 1), in accordance with one or more implementations.

At an operation 304, identity verifier data (e.g., driver's license data, biometric data, state and/or federal license number, and/or entity public key(s) paired to an entity private key(s)) and/or relationship verifier data (e.g. related entity data, relationship linker data, share certificate) associated with the one or more entities may be extracted from corresponding verification addresses on a block chain/distributed ledger. A given verification address may be derived from a verification public key which is paired with a verification private key. First entity verifier data (e.g., driver's license data, biometric data, state and/or federal license number, and/or entity public key(s) paired to an entity private key(s)), and/or first relationship verifier data (e.g., related entity data, relationship linker data and/or share certificate) associated with the first entity may extracted from a first verification address assigned to the first entity. The first verification address may be derived from a first public key which is paired with a first verification private key. Operation 304 may be performed by one or more hardware processors configured to execute a machine-readable instruction component that is the same as or similar to information extraction component 118 (as described in connection with FIG. 1), in accordance with one or more implementations.

At an operation 306, the identity of the one or more entities and/or relationship between the one or more entities and one or more related entities may be verified upon, or in response to, receiving matching identity verifier data (e.g., driver's license data, biometric data, state and/or federal license number, and/or entity private key(s) paired to the stored entity public key(s)), and matching relationship verifier data (e.g., related entity data, relationship linker data and/or share certificate). The entity identity of the first entity may be verified upon, or in response to, receipt of (a) identity verifier data (e.g., driver's license data, biometric data, driver's license data and/or biometric data, state and/or federal license number, and/or entity private key(s) paired to the stored entity public key(s)) matching the first identity verifier data (e.g., driver's license data and/or biometric data, state and/or federal license number, and/or entity public key(s) paired to an entity private key(s) and (b) relationship verifier data (e.g., related entity data, relationship linker data and/or share certificate) matching the first relationship verifier data (e.g., related entity data, relationship linker data and/or share certificate). Operation 306 may be performed by one or more hardware processors configured to execute a machine-readable instruction component that is the same as or similar to identity verification component 120 (as described in connection with FIG. 1), in accordance with one or more implementations.

Exemplary implementations may facilitate storing entity verifier data on the block chain, distributed ledger or computer-readable storage media connected to the blockchain/distributed ledger. The identity verifier data may be stored on the block chain, distributed ledger or computer-readable storage media connected to the blockchain/distributed ledger in an encrypted way and/or in a hashed way. A person may be identified at the block chain/distributed ledger level with one or more of a pair of entity public key and entity private key, a finger print, a finger print hash, an eye retina, an eye retina hash, and/or other unique information. The data stored may include or relate to one or more of a passport, an identification card, extracted passport information, a driver's license, extracted driver's license information, finger print, eye retina, and/or other information. According to some implementations, if some of the data is changed, a new record may be created for that person in the block chain/distributed ledger. That is, all changes are added as new records. The old record will always be stored on the block chain. Generally speaking all records on the block chain/distributed ledger are stored forever and cannot be removed. More than one copy of the block chain/distributed ledger will exist to ensure the records are not manipulated.

Exemplary implementations may facilitate access to personal data, company data, organizational data, information data of tangible and intangible things, and relationship data. There may be multiple access levels for the personal data, company data, organizational data, information data of tangible and intangible things, and relationship data in the block chain/distributed ledger or computer-readable storage media connected to the blockchain/distributed ledger. Access controls may be grated on public/private key pairs levels. Examples of access levels may include one or more of Super Admin (full access to block chain), Authorities-country level (full read-only access), Authorities-state/local level (limited read-only access), Police and other services including Emergency (access to certain personal data by Finger Print/Eye retina of that person only), Participating Merchants (limited access), and/or other access levels.

Any or all embodiments herein may be modified as follows: there is not necessarily a need to assign a verification address for a particular relationship of a first and second entity. If a third-party user (viewer) desires access to view relationship data, he/she may only use a correct identity verification address to access the to the relationship data of a targeted entity. In addition, even in the case where it is desirable to assign a verification address for a particular relationship, e.g., for limiting access to the first and second entity's other relationship data, the verification address assigned may be the same as the verification address for the first and/or second entity. One address may therefore enable a third party to verify the first and second entity and their relationship. Alternatively, two addresses may be used, or three separate addresses may be used. Where one address is used, there may be two or three separate addresses that are linked to a main address. Once the main address is used and the appropriate data provided for identification and verification, the two or three or more verification addresses linked to the main address are automatically verified.

Any or all embodiments herein may be modified by providing for an entity to be verified using previously verified relationships. For example, where an entity has lost its entity private key and verification using its identity verifier has failed, an entity selects the system option for identity verification using relationships (preferably multiple relationships). Upon receipt of a request of ID verification using relationship information, the system extracts the relationship verifier data (related entity data, relationship linker data, and other relationship verification data, such as share certificate) recorded at the verification address(es) according to the entity identifier associated with the entity, and generates a set of relationship verification questions according to the extracted relationship verifier data. Multiple relationship verification questions are preferred. The system provides the relationship verification questions and answer options to the entity. E.g. "Please click to choose from the following name list to indicate who are your friends linked in Facebook®." The entity answers the relationship verification question(s). Upon receipt of correct answers for one or more (or even all depending on the system's stringency) relationship verification questions, the entity's identity is verified.

In another embodiment, the system may assign Identifiers to entities A, B (and if desired, additional entity(ies)), where A, B (and if desired, additional entity(ies)) have previously verified identities; Assign identity verifiers to Entities A, B (and if desired, additional entity(ies)); Associate relationship verifiers (related entity and/or relationship linkers including label and index and/or other relationship information) between/among entities A, B (and if desired, additional entity(ies)) for previously verified relationships; Establish first and second verification addresses (or more) on a block chain/distributed ledger and perform block chain/distributed ledger-based entity identity verification of first and second (or more) entities and/or a third verification address (or more) for verification of relationship (or relationships) between entities A and B (or more), where the first verification address is derived from a first verification public key which is paired with a first verification private key, the second verification address is derived from a second verification public key which is paired with a second verification private key, and the third verification address derived from a third verification public key which is paired with a third verification private key, In response to a request for verification of the identity of e.g., entity A, enter identifiers for Entities A, B (and if desired, additional entity(ies)) and relationship data for Entities A, B (and if desired, additional entity(ies)); compare the relationship data with the relationship verifiers for Entity A, and if there is correspondence of the relationship verifier data with the entered relationship data, then the identity of Entity A is verified.

Some additional examples of uses of embodiments of the invention, which are purely exemplary, are provided below. For example, in addition to cases of merely verifying one entity A, or one entity B, and/or verifying a relationship between A and B, there may be multiple relationships and/or multiple entities, e.g., entity A is a person, entity B is a company, entity C is a building, entity D is another person, entity E is a lease agreement, and relationship between A and B is that A owns B, relationship between B and C is that company owns building, relationship between building and entity D is that D rents an apartment in the building and entity E is the lease agreement between D and B. There may also be an entity or subentity E which is the apartment in building C that D is renting.

In some situations in which there are more than two entities involved in verification, some relationships may be verifiable by deductive reasoning from a relationship chain or network. For example, in a situation with three entities where Company A owns 100% of Company B, Company B owns 100% of Company C, then by deductive reasoning Company A must own 100% of Company C.

Where there are four entities, e.g., related as follows: Company A owns 100% of Company B, Company B owns 50% of Company C, and Company Y owns 50% of Company C, then by deductive reasoning, Company A must own 50% of Company C, Company B and Company Y must have a relationship of co-ownership (50-50) to Company C, and Company A and Company Y must have a relationship of co-ownership (50-50) to Company C.

Figure 4:
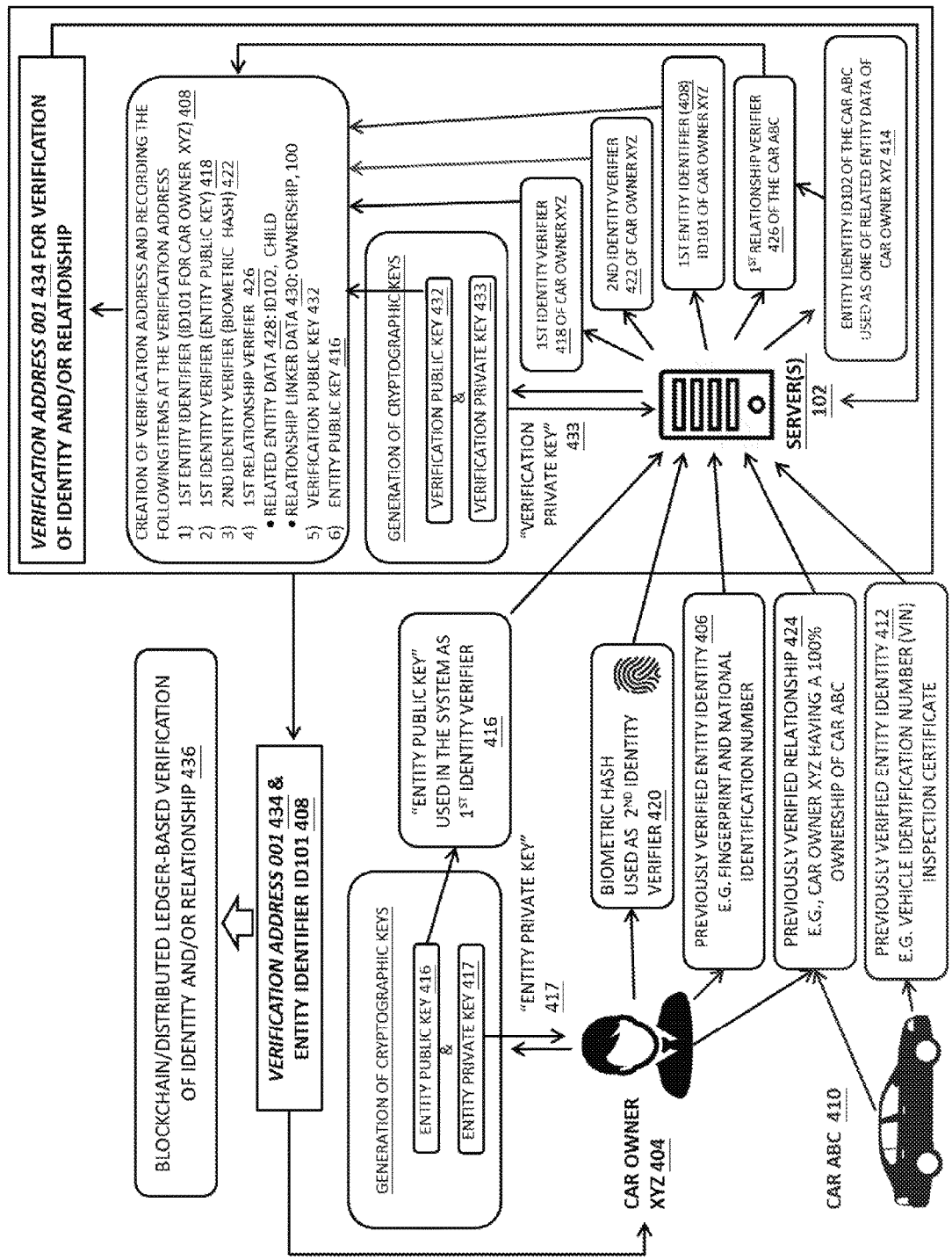
FIG. 4 is a schematic flow diagram for recording information and creating a verification address in a block chain/distributed ledger system in a case of a first entity (an owner of a car), a second entity (the car) and a relationship between the first and second entity (ownership).
Figure 5:
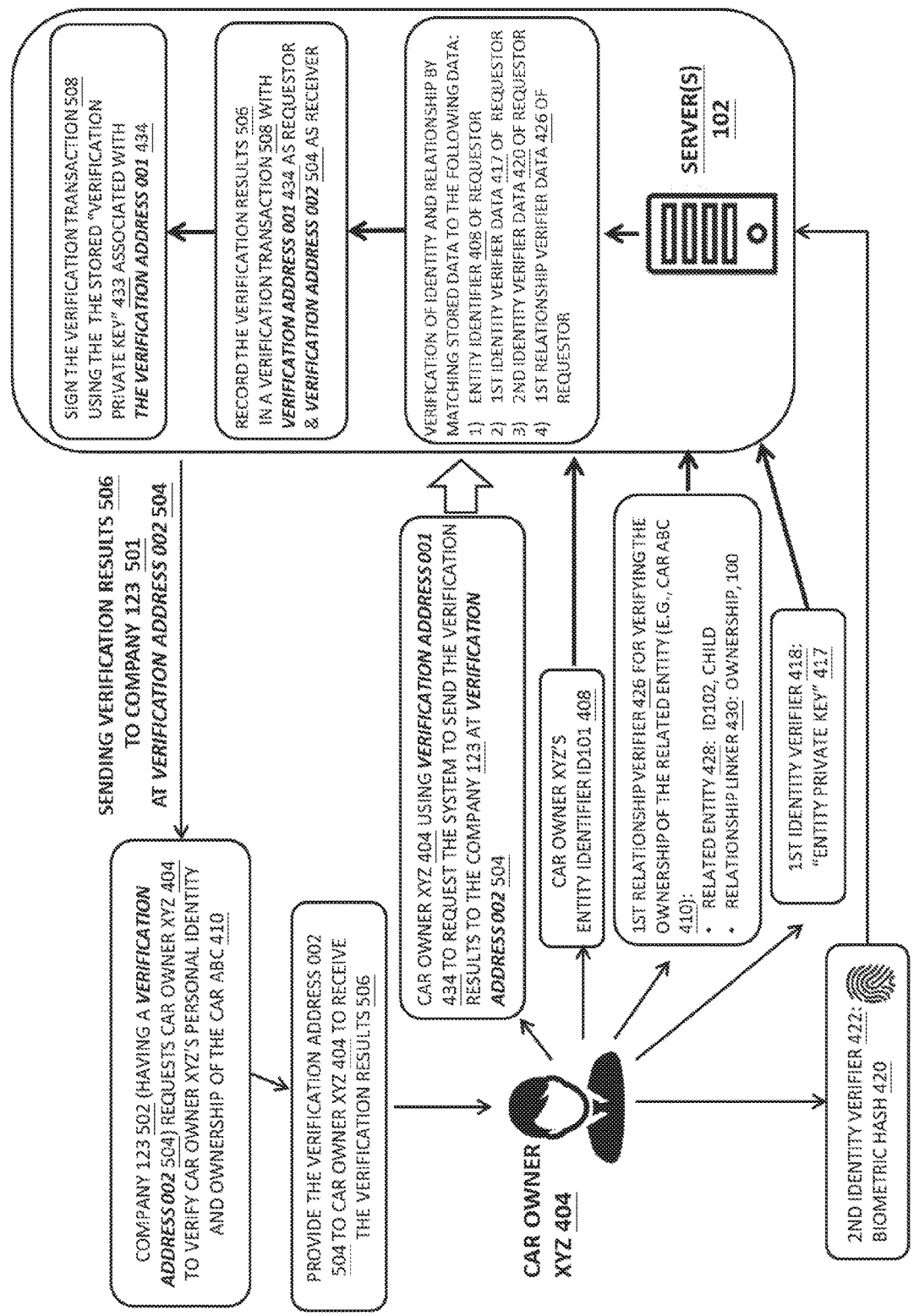
FIG. 5 is a schematic flow diagram for verifying the identity of the first entity (the owner) and a relationship (ownership of the second entity, the car).

Another example in shown in FIG. 4 and FIG. 5, where FIG. 4 shows a schematic flow diagram for recording information and creating a verification address in a block chain/distributed ledger system in a case of a first entity (an owner of a car), a second entity (the car) and a relationship between the first and second entity (ownership), and FIG. 5 shows a schematic flow diagram for verifying the identity of the first entity (the owner) and a relationship verifier (ownership of the second entity, the car).

FIG. 4 illustrates schematic flow for recording information and creating a verification address in a block chain/distributed ledger system in a case of a first entity (an owner of a car), a second entity (the car) and a relationship between the first and second entity (ownership of the second entity, the car). Before an entity can use the system for verification of his/her/its identity and/or relationship to any related entities (persons, companies, organizations, tangible things or intangible things), the entity needs to register to obtain a unique verification address from the system. In the process of registration, the most critical process is the establishment of verification address(es). Each verification address is derived from a unique verification public key, which is paired with a verification private key.

In order to establish one or more verification addresses on the blockchain/distributed ledger for verification of an entity's identity and/or verification of the entity's relationship to other related entities, an entity 404 (e.g. CAR OWNER XYZ) must have his/her/its identity previously verified 412, and/or have his/her/its relationship to any related entities (any relationships that require verification by any other parties) previously verified 424. In some applications, the identity of a related entity 410 (e.g., CAR ABC) must be previously verified 412 too.

Server(s) 102 of the system assigns a first entity identifier 408 (e.g., ID101) to a first entity 404 (e.g., CAR OWNER XYZ), and assigns a second entity identifier 414 (e.g., ID102) to a related entity 410 (e.g., CAR ABC) for the express purpose of distinguishing identity of an entity recorded in the system.

The server(s) 102 collects identity verifiers (e.g., entity public key 416 as the first identity verifier 418, entity's biometric hash 420 as the second identity verifier 422), from the first entity 404 (e.g., CAR OWNER XYZ). Identity verifiers may include anything that uniquely or substantially uniquely identifies individuals, companies, organizations, government, tangible or intangible things or assets, or devices (e.g., in the internet of things), so they could be used to verify identity of an entity.

The server(s) 102 also needs relationship verifiers for the express purpose of verifying relationship between two or more entities recorded in the system. The server(s) 102 extracts relationship information from a previously verified relationship 424 (e.g. ownership of the second entity, the car) to create a first relationship verifier 426, data of which include related entity data 428 and relationship linker data 430. Related entity data 428 may include a paired entity identifier and relationship position (e.g., ID102, CHILD), whereas relationship linker data 430 may include a paired relationship label and relationship index (e.g., OWNERSHIP, 100). For the related entity data 428, an input of "ID102" indicates the second entity (e.g., CAR ABC 410) with an assigned entity identifier of "ID102" 414 is the related entity of the first entity (e.g., CAR OWNER XYZ 404); and a relationship position of "CHILD" indicates the related entity (e.g., CAR ABC 410) is a child entity of the first entity (e.g., CAR OWNER XYZ 404). In a case of ownership, a child entity (e.g., CAR ABC 410) is defined as an entity being possessed by the parent entity (e.g., CAR OWNER XYZ 404). For the relationship linker data 430, a relationship label of "OWNERSHIP" indicates the relationship belongs to the ownership type; and a relationship index of 100 indicates 100% ownership. Combined use of related entity data 428 (e.g., ID102, CHILD) and relationship linker data (e.g., OWNERSHIP, 100) is sufficient to describe an entity's relationship to a related entity (e.g. the relation entity, CAR ABC 410, with ID102 being possessed 100% by the first entity, CAR OWNER XYZ 404). In some implementations, addition relationship verifier data may be included such as a certificate as a proof for the presence of a relationship (e.g., vehicle identification number (VIN) inspection certificate).

After collecting the first entity identifier 408 (e.g., "ID101" belonging to CAR OWNER XYZ 404) and all the required identity verifier(s) (entity public key 416 as the first identity verifier 418, and biometric hash 420 as the second identity verifier 422) and relationship verifier(s) (e.g., the first relationship verifier indicating CAR OWNER XYZ 404 having a solo ownership of CAR ABC 410), the first entity identifier 408, the first identity verifier 418, the second identity verifier 422 and the first relationship verifier 426 are recorded at the verification address (e.g., verification address 001). Finally, the verification address 434 (e.g., verification address 001) and entity identifier 408 (e.g., "ID101" 408 being to CAR OWNER XYZ 404) are returned to the first entity (e.g., CAR OWNER XYZ 404) for later use in verification of identity and/or relationship.

Server(s) 102 assigns the first relationship verifier 426 to the previously verified relationship 424 between the first entity and a related entity.

FIG. 5 illustrates schematic flow for verifying the identity of the first entity (the owner) and a relationship (ownership of the second entity, the car). A request for verification of an entity's identity and/or the entity's relationship to a related entity is usually initiated because of a practical need. For example, a third entity 502 (e.g., COMPANY 123) requests the first entity 404 (e.g., CAR OWNER XYZ) to verify the first entity's identity and the first entity's relationship to the second entity 410 (e.g., ownership of CAR ABC). To perform the blockchain/distributed ledger-based verification of identity and/or verification of relationship 436, the third entity 502 (e.g., company 123) must be a registered user and obtain a verification address 504 (e.g., verification address 002) from the system for receiving any verification results 506.

The first entity 404 (e.g. CAR OWNER XYZ) receives a request from a third entity 502 (e.g., COMPANY 123) to verify the first entity's 404 (e.g., CAR OWNER XYZ's) identity and to verify the first entity's 404 (e.g., CAR OWNER XYZ's) relationship to a second entity 410 (e.g. ownership of CAR ABC), and receives the third party's verification address 504 (e.g., verification address 002) for providing the verification results 506 to the third entity (e.g., COMPANY 123). In response to the request, the first entity (e.g., CAR OWNER XYZ) uses the first entity's verification address 434 (e.g., CAR OWNER XYZ's verification address 001) as a requestor address and the third entity's verification address 504 (e.g., COMPANY 123's verification address 002) as the receiver address to make a verification request to the system. In addition, the first entity 404 (e.g., CAR OWNER XYZ) submits the first's entity identifier 408 (e.g., ID101), first identity verifier 418 (e.g., entity private key 417), second identity verifier 422 (e.g., biometric hash 420) and first relationship verifier 426 (e.g., related entity data 428 and relationship linker data 430) to the server(s) 102.

Upon the receipt of the verification request, the first entity identifier 408 (e.g., ID101), first identity verifier 418 (e.g., entity private key 417), second identity verifier 422 (e.g., biometric hash 420) and first relationship verifier 426 (e.g., related entity data 428 and relationship linker data 430), the server(s) 120 performs the verification of the requestor's identity (e.g., the identity of CAR OWNER XYZ 404) and the requester's relationship to a related entity (e.g., CAR OWNER XYZ's ownership of CAR ABC) through matching the first entity identifier 408 (e.g., ID101), first identity verifier 418 (e.g., entity private key 417), second identity verifier 422 (e.g., biometric hash 420) and first relationship verifier 426 (e.g., related entity data 428 and relationship linker data 430) to the corresponding data previously recorded at the requestor verification address (e.g., verification address 001).

Upon the receipt of the first entity identifier 408 (e.g., ID101), first identity verifier 418 (e.g., entity private key 417), second identity verifier 422 (e.g., biometric hash 420) and first relationship verifier 426 (e.g., related entity data 428 and relationship linker data 430) matching the stored entity identifier data, stored first identity verifier data, stored second identity verifier and stored relationship verifier, the identity of the first entity 404 (e.g., CAR OWNER XYZ) and the first entity's relationship to the second entity 410 (e.g., ownership CAR ABC) are verified.

The server(s) subsequently records the verification results 506 in a verification transaction 508 with the first entity's verification address 434 (e.g., verification address 001) as the requestor address and the third entity's verification address 504 (e.g., verification address 002) as the receiver address, sign the verification transaction with verification private key 433, and send the verification transaction containing the verification results 506 to the third entity 502 (e.g., COMPANY 123).

From the above described example and/or other disclosure herein, other examples of types of entities and relationships that may be verified include: vehicles (automobiles, trucks, boats, planes or trains or train cars); ownership or lease rights of a vehicle, e.g., for use by the Department of Motor Vehicles, an auto manufacturer, and/or government officials such as law enforcement; in cryptocurrency to verify ownership of a certain amount of cryptocurrency; in brokerage accounts to verify ownership of a portfolio and/or individual investments e.g., stocks, bonds and/or other securities; to verify ownership of a bank account or accounts; in real property to verify ownership of a property, e.g., as part of a county recording system, and/or to verify a lease interest.

Exemplary implementations may facilitate verification check. There may be multiple levels for how it is possible to check verification. For example, some implementations may ensure a person has a record at "Company" but no personal data is provided. Some implementations may ensure a person has a record at Company and get very basic personal information such as Full Name, DOB, Gender, and/or other basic information. Some implementations may ensure a person has a record at Company and get all personal data.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a verification to verify identity of an entity, the system comprising:
   one or more computer-readable storage media configured to store a blockchain or distributed ledger; and
   a first computer system comprising one or more processors programmed to execute computer program instructions that, when executed, cause the first computer system to:
   generate a verification public key and a verification private key;
   derive a first verification address from the verification public key, the first verification address identifying a storage location in the blockchain or distributed ledger;
   store, at the storage location in the blockchain or distributed ledger identified by the first verification address, stored identifier data of the entity and stored verifier data for the entity;
   in response to an identity verification request received from a second computer system, wherein the identity verification request includes the first verification address, retrieve the stored identifier data for the entity and the stored verifier data for the entity from the storage location in the blockchain or distributed ledger identified by the first verification address; and
   if the stored identifier data of the entity matches inputted identifier data received from the second computer system and if the stored verifier data for the entity matches inputted verifier data received from the second computer system, performing the verification by verifying that the inputted verifier data from the request corresponds with the entity,
   wherein the verification comprises:
   storing verification results at a second verification address, the verification results verifying that the entity is associated with the request, wherein the second verification address identifies a second storage location in the blockchain or distributed ledger different from the storage location in the blockchain or distributed ledger identified by the first verification address.

2. The system of claim 1, wherein the verification results comprise data generated using the verification private key.

3. The system of claim 1, wherein the first computer system sends a third computer system a notification that the verification results have been stored at the second verification address.

4. The system of claim 3, wherein the identity verification request received from a second computer system includes the second verification address.

5. The system of claim 1, wherein the entity is selected from a group of an individual, a device, a part of a device, a vehicle, real property, medical records, an amount of cryptocurrency, a stock, a bond, a bank account, a credit card account, a document, an intangible right, information, a business, a government, an institution and a government agency.

6. The system of claim 1, wherein the stored identifier data comprises data extracted from an identifier, and wherein the stored verifier data comprises data extracted from a verifier.

7. The system of claim 1, wherein the first computer system is caused to further store, at the first verification address, relationship verifier data for a previously verified relationship between the entity and another entity.

8. The system of claim 1, wherein the stored verifier data comprises biometric data related to a fingerprint, palm veins, face recognition, DNA, palm print, hand geometry, iris recognition, retina, odor, gait, or voice and stored in a form of an image, a recording, a template, a biometric hash or a biometric vector.

9. The system of claim 1, wherein the stored identifier data comprises a unique identification number assigned to the entity by the first computer system.

10. The system of claim 1, wherein the stored identifier data, the stored verifier data, and the first verification address are different from one another and different from the verification private key, and different from the verification public key from which the first verification address was derived.

11. A system for providing a verification to verify identity of an entity, the system comprising:
    one or more computer-readable storage media configured to store a blockchain or distributed ledger; and
    a first computer system comprising one or more processors programmed to execute computer program instructions that, when executed, cause the first computer system to:
    generate a verification public key and a verification private key;
    derive a first verification address from the verification public key, the first verification address identifying a storage location in the blockchain or distributed ledger;
    store, at the storage location in the blockchain or distributed ledger identified by the first verification address, stored identifier data of the entity and stored verifier data for the entity;
    in response to an identity verification request received from a second computer system, wherein the identity verification request includes the first verification address, retrieve the stored identifier data for the entity and the stored verifier data for the entity from the storage location in the blockchain or distributed ledger identified by the first verification address; and
    if the stored identifier data of the entity matches inputted identifier data received from the second computer system and if the stored verifier data for the entity matches inputted verifier data received from the second computer system, performing the verification by verifying that the inputted verifier data from the request corresponds with the entity, wherein the first computer system is caused to:
    store, at the storage location in the blockchain or distributed ledger identified by the first verification address, an entity private key data, wherein the entity private key data was previously generated by the second computer system;
    obtain, from the second computer system, an inputted entity private key data in connection with the request;
    retrieve the stored entity private key data using the first verification address included in the request; and
    perform the verification only if the stored identifier data of the entity matches the inputted identifier data received from the second computer system, the stored verifier data for the entity matches the inputted verifier data received from the second computer system, and the stored entity private key data matches the entity private key data received from the second computer system.

12. A method of providing multifactor identity verification, the method being implemented by a first computer system comprising one or more processors executing computer program instructions that, when executed, perform the method, the method comprising:
    generating a verification private key and a verification public key;
    deriving a first verification address from the verification public key, the first verification address identifying a storage location in a blockchain or distributed ledger,
    storing, at the storage location in the blockchain or distributed ledger, identified by the first verification address, stored identifier data of an entity and stored verifier data for the entity,
    obtaining, from a second computer system, an inputted identifier and inputted verifier data in connection with a request to verify the entity's identity, the request indicating the first verification address associated with the blockchain or distributed ledger;
    in response to the request received from the second computer system, wherein the identity verification request includes the first verification address, retrieving the stored identifier data for the entity and the stored verifier data for the entity from the storage location in the blockchain or distributed ledger identified by the first verification address; and
    if the stored identifier data for the entity matches inputted identifier data received from the second computer system and if the stored verifier data for the entity matches the inputted verifier data received from the second computer system, performing verification by verifying that the inputted verifier data from the request corresponds with the entity,
    wherein the step of performing verification further includes a step of:
    storing verification results at a second verification address, the verification results verifying that the entity is associated with the request, wherein the second verification address identifies a second storage location in the blockchain or distributed ledger different from the storage location in the blockchain or distributed ledger identified by the first verification address.

13. The method of claim 12, wherein the verification results comprise data generated using the verification private key.

14. The method of claim 12, wherein the first computer system sends a third computer system a notification that the verification results have been stored at the second verification address.

15. The method of claim 14, wherein the identity verification request received from a second computer system includes the second verification address.

16. The method of claim 12, wherein the entity is selected from a group of an individual, a device, a part of a device, a vehicle, real property, medical records, an amount of cryptocurrency, a stock, a bond, a bank account, a credit card account, a document, an intangible right, information, a business, a government, an institution and a government agency.

17. The method of claim 12, wherein in the method, the first computer system is caused to further store, at the first verification address, relationship verifier data for a previously verified relationship between the entity and another entity.

18. The method of claim 12, wherein the stored verifier data comprises biometric data related to a fingerprint, palm veins, face recognition, DNA, palm print, hand geometry, iris recognition, retina, odor, gait, or voice and stored in a form of an image, a recording, a template, a biometric hash or a biometric vector.

19. The method of claim 12, wherein the stored identifier data comprises at least one of a unique identification number assigned to the entity by the first computer system.

20. The method of claim 12, wherein the stored identifier data, the stored verifier data, and the first verification address are different from one another and different from the verification private key, and different from the verification public key from which the first verification address was derived.

21. A method of providing multifactor identity verification, the method being implemented by a first computer system comprising one or more processors executing computer program instructions that, when executed, perform the method, the method comprising:
generating a verification private key and a verification public key;
deriving a first verification address from the verification public key, the first verification address identifying a storage location in a blockchain or distributed ledger,
storing, at the storage location in the blockchain or distributed ledger, identified by the first verification address, stored identifier data of an entity and stored verifier data for the entity,
obtaining, from a second computer system, an inputted identifier and inputted verifier data in connection with a request to verify the entity's identity, the request indicating the first verification address associated with the blockchain or distributed ledger;
in response to the request received from the second computer system, wherein the identity verification request includes the first verification address, retrieving the stored identifier data for the entity and the stored verifier data for the entity from the storage location in the blockchain or distributed ledger identified by the first verification address; and
if the stored identifier data for the entity matches inputted identifier data received from the second computer system and if the stored verifier data for the entity matches inputted verifier data received from the second computer system, performing verification by verifying that the inputted verifier data from the request corresponds with the entity, wherein the first computer system further carries out steps of:
storing, at the storage location in the blockchain or distributed ledger identified by the first verification address, an entity private key data, wherein the entity private key data was previously generated by the second system;
obtaining, from the second computer system, an entity private key data in connection with the request;
retrieving the stored entity private key data using the first verification address included in the request; and
performing the verification only if the stored identifier data for the entity matches an inputted identifier received from the second computer system, the stored verifier data for the entity matches inputted verifier data received from the second computer system, and the stored entity private key data matches the entity private key data received from the second computer system.

22. A system for providing verification, the system comprising:
one or more computer-readable storage media configured to store a blockchain or distributed ledger; and
a first computer system comprising one or more processors programmed to execute computer program instructions that, when executed, cause the first computer system to:
generate a verification private key and a verification public key;
derive a verification address from the verification public key, the verification address identifying a storage location in the blockchain or distributed ledger;
store, at the storage location in the blockchain or distributed ledger identified by the verification address, at least one of the following:
(i) identifier data for a first entity and verifier data for the first entity in association with the verification address associated with the blockchain or distributed ledger in a form of first identifier data and first verifier data, respectively;
(ii) identifier data for a second entity and verifier data for the second entity in association with the verification address associated with the blockchain or distributed ledger in a form of second identifier data and second verifier data, respectively; and
(iii) relationship verifier data of a relationship in association with the verification address associated with the blockchain or distributed ledger in a form of relationship verifier data;
in response to a verification request to verify the relationship between the first entity and the second entity received from a second computer system, wherein the verification request includes the verification address associated with the blockchain or distributed ledger and at least one of (a) inputted first identifier data and inputted first verifier data; (b) inputted second identifier data and inputted second verifier data, and (c) inputted relationship verifier data in connection with the request, retrieve the at least one of (i) the stored first identifier data and the stored first verifier data, (ii) the stored second identifier data and the stored second verifier data, and (iii) the stored relationship verifier data; and
if the at least one of the (a) inputted first identifier data and inputted first verifier data; (b) inputted second identifier data and inputted second verifier data, and (c) inputted relationship verifier data of the request matches the at least one of (i) the stored first identifier data and the stored first verifier data, (ii) the stored second identifier data and the stored second verifier data, and (iii) the stored relationship verifier data, performing verification by verifying the relationship between the first entity and the second entity,
wherein the verification address is for the relationship verifier data, and there is also a first further verification address for the first identifier data and the first verifier data, and a second further verification address for the second identifier data and the second verifier data,
wherein the system is configured to store, as the relationship verifier data, a relationship linker including a relationship label indicative of the relationship between the first and second entities, and
wherein the system is configured to further store as part of the relationship verifier data a relationship index indicative of a percentage level of the relationship label that the first entity has in relation to the second entity.

23. The system of claim 22, wherein the same verification address corresponds to the first identifier data, the first verifier data, and the relationship verifier data.

24. The system of claim 22, wherein the same verification address corresponds to the first identifier data, the first verifier data, the second identifier data, the second verifier data, and the relationship verifier data.

25. The system of claim 22, wherein the stored first identifier data, the stored first verifier data, the stored second identifier data, the stored second verifier data, the stored relationship verifier data, and the verification address are different from one another and different from the verification private key and different from the verification public key from which the verification address was derived.

\* \* \* \* \*